United States Patent
Wu et al.

(10) Patent No.: US 7,639,563 B2
(45) Date of Patent: Dec. 29, 2009

(54) METHOD FOR SONIC INDICATION OF VOIDS IN CASING CEMENT

(75) Inventors: Peter T. Wu, Missouri City, TX (US); Alain Dumont, Kawasaki (JP); Pierre Campanac, Sugar land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 25 days.

(21) Appl. No.: 11/964,735

(22) Filed: Dec. 27, 2007

(65) Prior Publication Data

US 2009/0168597 A1 Jul. 2, 2009

(51) Int. Cl.
G01V 1/00 (2006.01)
(52) U.S. Cl. .......................................... 367/35; 181/105
(58) Field of Classification Search .................... 367/31, 367/35, 38, 57; 181/102, 105
See application file for complete search history.

(56) References Cited

U.S. PATENT DOCUMENTS

| | | | |
|---|---|---|---|
| 3,909,775 A * | 9/1975 | Lavigne | ....................... 367/32 |
| 4,594,691 A | 6/1986 | Kimball | |
| 4,896,303 A | 1/1990 | Leslie et al. | |
| 5,278,805 A | 1/1994 | Kimball | |
| 6,483,777 B1 | 11/2002 | Zeroug | |
| 2003/0058739 A1* | 3/2003 | Hsu et al. | ...................... 367/56 |
| 2006/0039238 A1* | 2/2006 | Mandal et al. | ................. 367/31 |
| 2006/0120217 A1 | 6/2006 | Wu et al. | |
| 2006/0262644 A1* | 11/2006 | Schoepf et al. | ................ 367/35 |
| 2007/0206439 A1 | 9/2007 | Barolak et al. | |

OTHER PUBLICATIONS

Rosenbaum, "Synthetic Microseismograms: Logging in Porous Formations", Geophysics, vol. 39, No. 1, (Feb. 1974).
Kimball et al. "Semblance Processing of Borehole Acoustic Array Data," Geophysics, vol. 49, No. 3 (Mar. 1984).
J.J. Jutten, P. Parcevaux, "Relationship Between Cement Bond Log Output and Borehole Geometrical Parameters" Society of Petroleum Engineers, SPC, No. SPE/IADC 16139, Mar. 15, 1987-Mar. 18, 1987, pp. 763-772.

* cited by examiner

*Primary Examiner*—Jack W. Keith
*Assistant Examiner*—Krystine Saito
(74) *Attorney, Agent, or Firm*—Matthias Abrell; Jaime Castano; Dale Gaudier

(57) ABSTRACT

A method for determining on a real time logging while drilling (LWD) basis the top of cement location between casing transition zones in a borehole using at least one sonic attributes of coherent energy, attenuation and slowness as a function of at least one of depth and time.

21 Claims, 7 Drawing Sheets

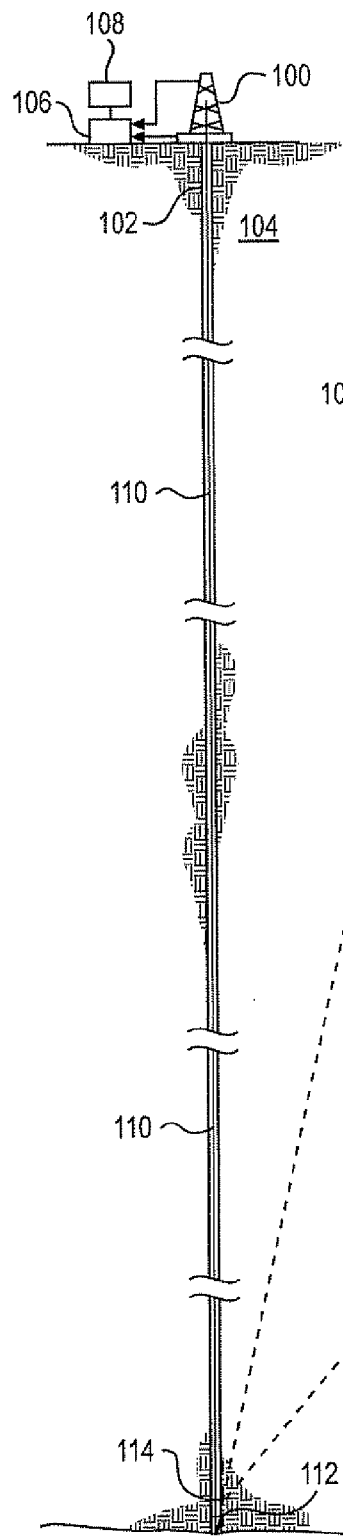
FIG. 1
*PRIOR ART*
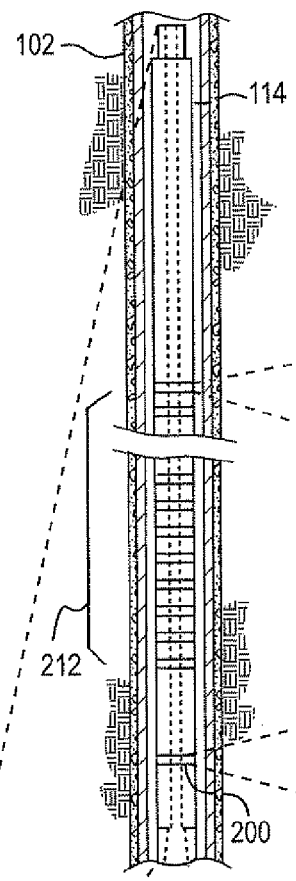
FIG. 2a
*PRIOR ART*
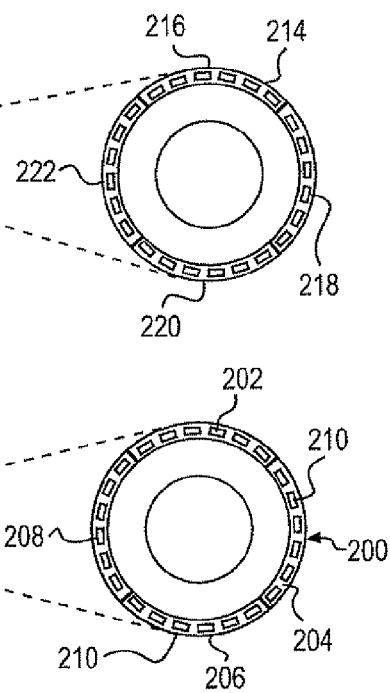
FIG. 2c
*PRIOR ART*
FIG. 2b
*PRIOR ART*

METHOD FOR SONIC INDICATION OF VOIDS IN CASING CEMENT

TECHNICAL FIELD

In an oil or gas well drilling process, the well is drilled in stages with decreasing diameters from top to bottom with successively smaller diameter bits and casings. Once a casing segment is set, the annulus between the casing and borehole is filled with cement to provide a pressure tight connection between the borehole and casing. An estimated amount of cement is pumped from the bottom of a casing segment up to a height sufficient to seal the last casing with the next-to-last casing. The estimate of cement, however, may not be very accurate due to the rugose and irregular nature of the borehole. It is therefore important to be able to measure or confirm the location of the top of the cement and to identify all zones where a cement bond is lacking to insure proper sealing between a wellbore casing and a surrounding wellbore formation. Acoustic wave attributes collected from a logging while drilling (LWD) trip through the casing after the casing is set can be used to provide such information to a driller in real-time and thus provide data for a relatively efficient cement squeeze remediation.

BACKGROUND OF THE INVENTION

In the oil and gas industry, acoustic tools are used to provide measurements of the attributes (such as slowness, attenuation, coherent energy, instantaneous frequency) of various types of waves propagated from transmitter to receiver. These attributes are analyzed to determine, among other things, the rate of flow of a hydrocarbon (gas or oil) out of a producing borehole in the hydrocarbon production industry. This critical information fundamentally depends on permeability of the formation, viscosity of the hydrocarbon and the existence of fractures. Collecting and recording this information on a delayed or real time basis is known as well logging Evaluation of physical properties such as pressure, temperature and wellbore trajectory in three-dimensional space and other borehole characteristics while extending a wellbore is known as measurements-while-drilling (MWD) and is standard practice in many drilling operations. MWD tools that measure formation parameters such as resistivity, porosity, sonic velocity, gamma ray, etc. of a formation are known as logging-while-drilling (LWD) tools. An essential formation parameter for determination in a drilling operation is the existence of gas deposits or zones in a formation, on a real time basis. Similarly, early detection of kick is essential information for conducting safe and efficient drilling operations.

For the above and other reasons, the oil industry has developed acoustic well logging techniques that involve placing an acoustic tool within a well bore to make measurements indicative of formation attributes such as compressional slowness (DTc), shear slowness (DTs) and Stoneley slowness (DTst). Sonic logs can be used as direct indications of subsurface properties and in combination with other logs and knowledge of subsurface properties can be used to determine subsurface parameters, such as those related to borehole structure stability, that can not be measured directly. Early efforts in this connection were reported by Rosenbaum in "Synthetic Microseismograms: Logging in Porous Formations", *Geophysics*, Vol. 39, No. 1, (February 1974) the disclosure of which is incorporated by reference as though set forth at length.

Acoustic logging tools typically include a transmitter and an array of axially spaced acoustic detectors or receivers. These tools are operable to detect, as examples, formation compressional waves (P), formation shear waves (S) and Stoneley (St) waves. These measurements can be performed following drilling or intermediate drill string trips by wireline logging operations. In wireline logging, sonic monopole tools can be used to measure compression waves (P) and shear waves (S) in fast formations. In addition to wireline logging, techniques have been developed where piezoelectric transmitters and hydrophone receivers are imbedded within the walls of drill string segments so that sonic LWD operations can be performed.

Early LWD and sonic data processing techniques developed by the Schlumberger Technology Corporation such as a slowness-time-coherence (STC) method is disclosed in U.S. Pat. No. 4,594,691 to Kimball et al. entitled "Sonic Well Logging" as well as in Kimball et al. "Semblance Processing of Borehole Acoustic Array Data," *Geophysics*, Vol. 49, No. 3 (March 1984). This method is most useful for non-dispersive waveforms (e.g. monopole compressional and shear head waves). For processing dispersive waveforms a dispersive slowness-time-coherence (DSTC) method is preferred. This process is disclosed in U.S. Pat. No. 5,278,805 to Kimball entitled "Sonic Well Logging Methods and Apparatus Utilizing Dispersive Wave Processing." The disclosures of these patents, of common assignment with the subject application, as well as the noted *Geophysics* publication authored by an employee of Schlumberger are hereby also incorporated by reference.

Sonic wireline tools, such as a Dipole Shear Sonic Imager (DSI—trademark of Schlumberger) and Schlumberger's Sonic Scanner generally have a multi-pole source. A multi-pole source may include monopole, dipole and quadrupole modes of excitation. The monopole mode of excitation is used traditionally to generate compressional and shear head waves such that formation compressional and shear slowness logs can be obtained by processing the head wave components. The head wave components are non-dispersive and are generally processed by slowness-time-coherence (STC) methods as discussed in the Schlumberger Kimball et al. '691 patent and Vol. 49 *Geophysics* article noted above.

The slowness-time-coherence (STC) method is employed to process the monopole wireline or LWD sonic waveform signals for coherent arrivals, including the formation compressional, shear and borehole Stoneley waves. This method systematically computes the coherence (C) of the signals in time windows which start at a given time (T) and have a given window move-out slowness (S) across the array. The 2D plane C(S,T) is called the slowness-time-plane (STP). All the coherent arrivals in the waveform will show up in the STP as prominent coherent peaks. The compressional, shear and Stoneley slowness (DTc, DTs, and DTst) will be derived from the attributes of these coherent peaks.

Traditionally, the attributes associated with the wave components found in the STP are the slowness, time and the peak coherence values. These three attributes are used in a labeling algorithm, discussed below, to determine the compressional, shear and Stoneley slowness from all of the STP peak candidates. These attributes can also be used for quality control purposes.

Although determining traditional attributes has been highly effective in the past, a need exists for enhancing information with respect to well cementing operations at each diameter transition stage and at other irregular zones where full cement bonding around a casing may be lacking to insure the cementing integrity of the well and correct for improper cement estimates on a real time basis while it is efficient to perform a corrective cement squeeze operation.

SUMMARY OF THE INVENTION

The methods of the subject invention recognize that in a free pipe zone, without a good cement bond, the casing is free to vibrate in an extensional mode with a casing wave slowness of approximately 57 μs/f and with high amplitude (or coherent energy) and low attenuation. A well-bonded cement layer will damp out this casing mode and result in low amplitude and high attenuation. In addition, due to the low signal in the cement zone, the slowness estimates are much more scattered than those in the free pipe zone. A free pipe flag will be set to indicate the location of the top of cement and zones where cement bond are lacking based on changes to: the amplitude or CE of the casing wave, the attenuation (ATT) of the casing wave, and the variability of the estimated slowness (DT) of the casing wave. The depth at which this flag is set will be the top-of-cement depth or zones where hydraulic seal between a borehole casing and surrounding cement may be lacking.

THE DRAWINGS

Other aspects of the present invention will become apparent from the following detailed description of embodiments taken in conjunction with the accompanying drawings wherein:

FIG. 1 is a schematic of a typical derrick and a logging while drilling (LWD) system where a drill string is positioned within a borehole and a well logging transceiver and receivers are imbedded within a drill collar near a drill bit;

FIG. 2a is an enlarged diagram of the drill string with a logging tool within a borehole taken at a location within a cased and cemented borehole;

FIG. 2b is a schematic cross-sectional view of a quadrupole sonic transmitter taken from the LWD segment shown in FIG. 2a;

FIG. 2c is a schematic cross-sectional view of a quadrupole receiver from a stack of receivers of the LWD tool shown in FIG. 2a;

Figure 4:
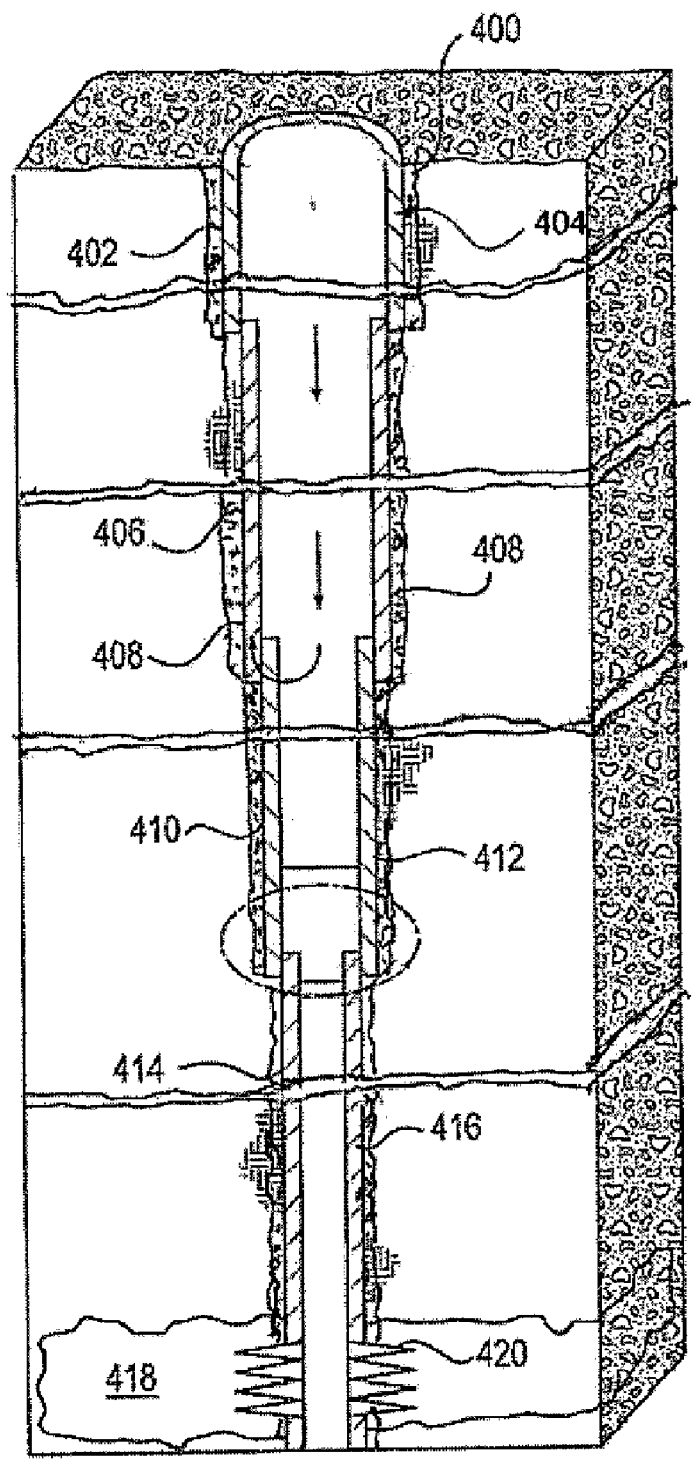
Figure 5:
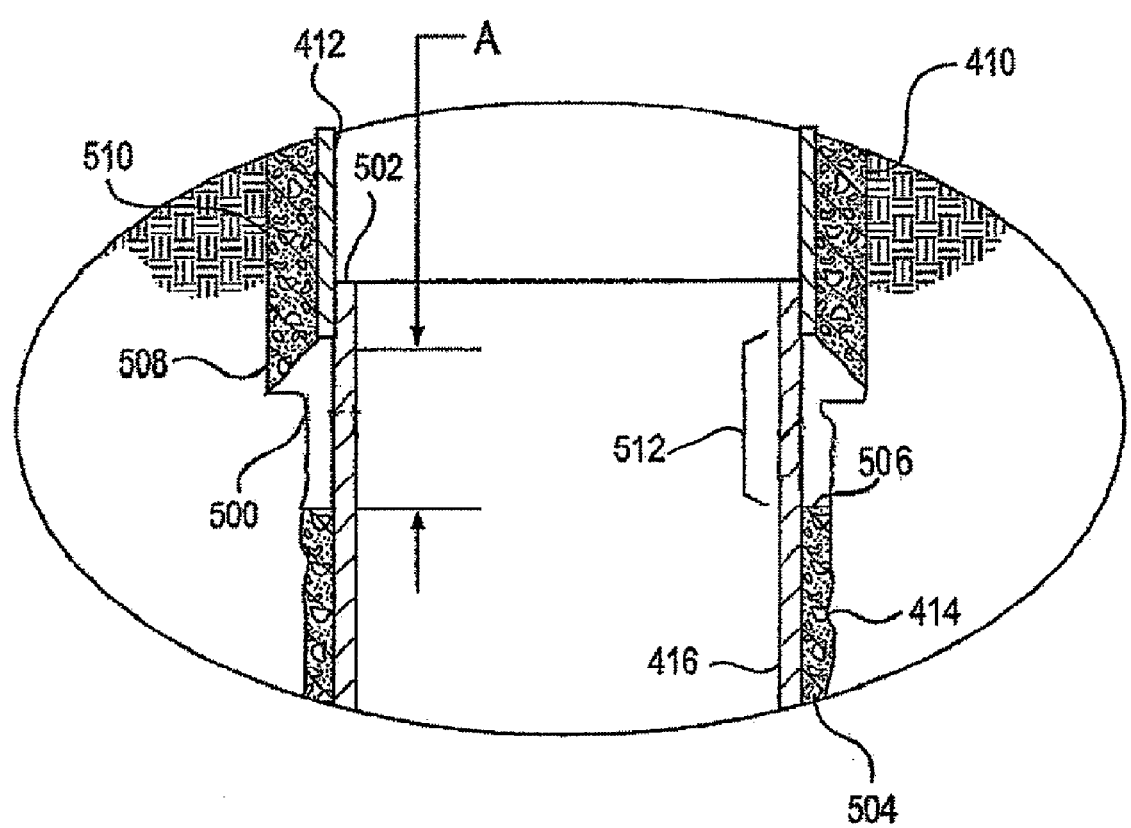
Figure 6:
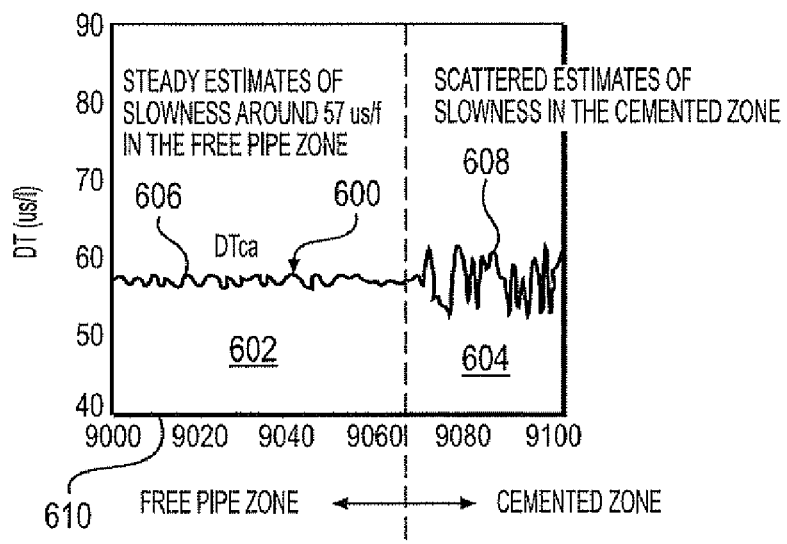
Figure 7:
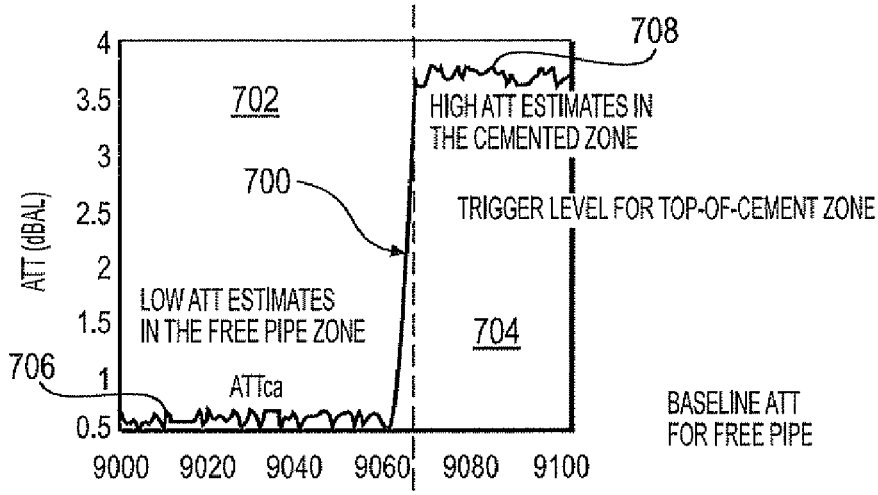
Figure 8:
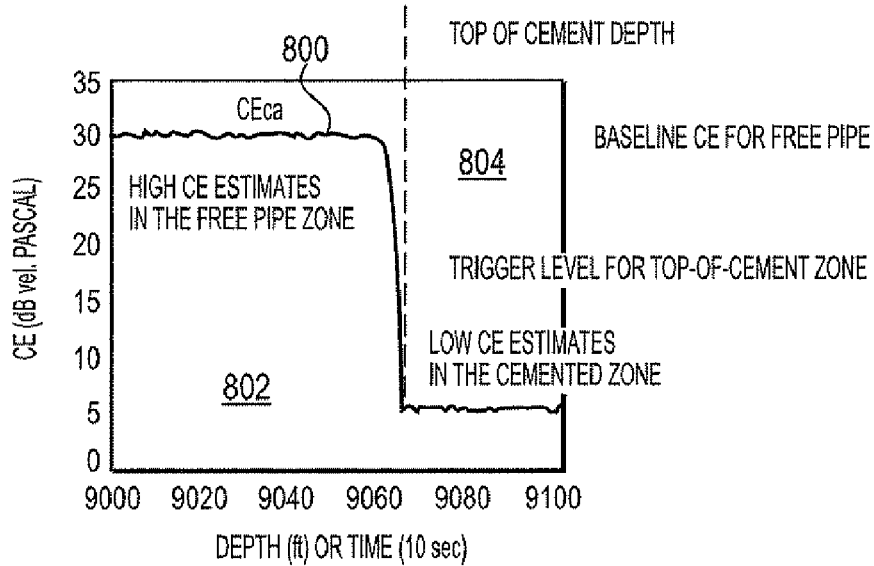
Figure 9:
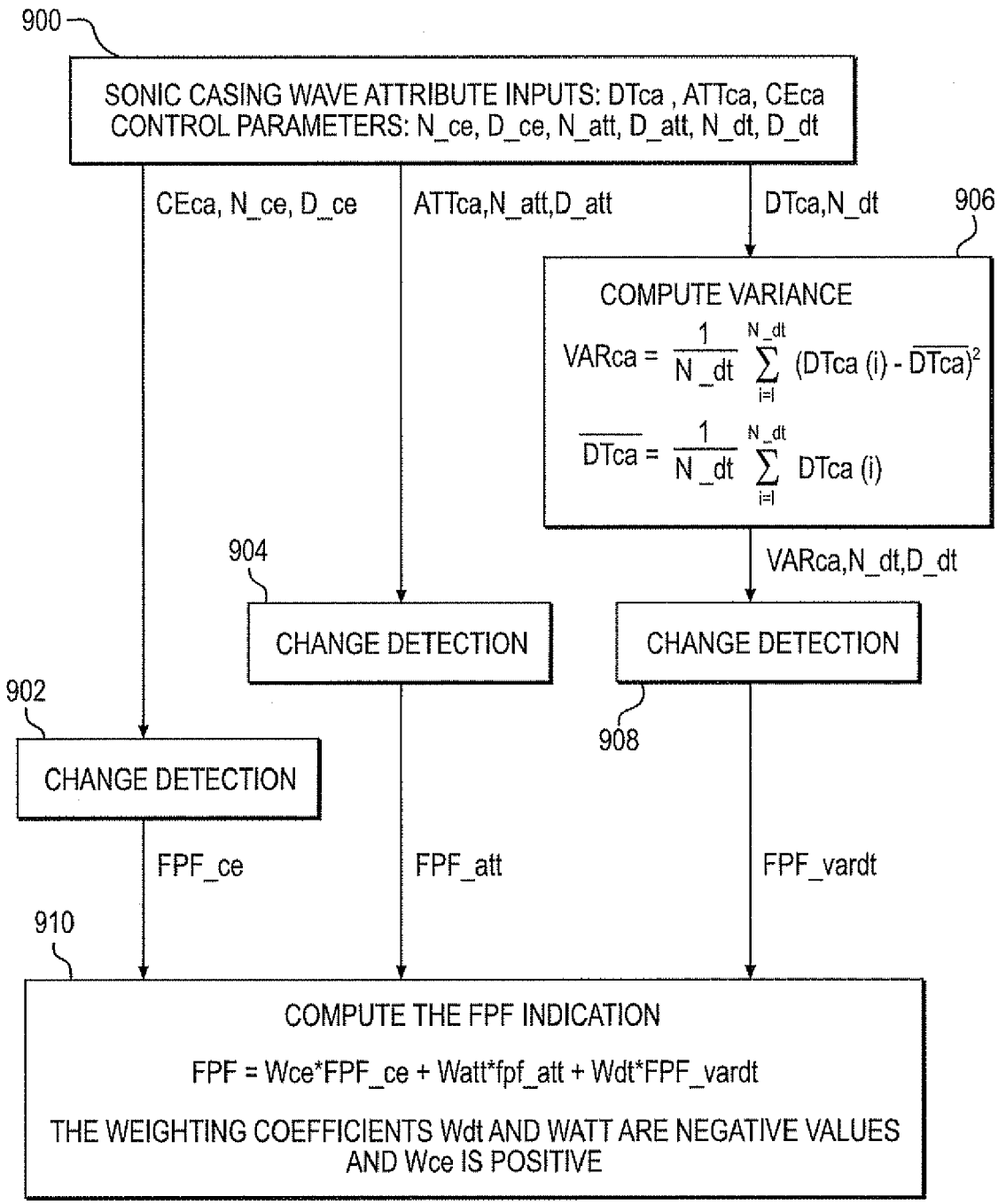

FIG. 4 schematic view of a well hole broken in several sections and revealing the existence of surface casing; intermediate casing and production casing of a typical well;

FIG. 5 is a detailed view of an elliptical segment of FIG. 4a transition or junction zone of one diameter casing with another smaller diameter casing and the existence of a possible cementing gap "A" around the casing transition zone;

FIG. 6 is a graphic illustrating the behavior of slowness estimates, DT, for the casing wave in a free casing zone and a cemented casing zone;

FIG. 7 is a graphic illustrating the attenuation, ATT, for the casing wave in a free casing zone and a cemented casing zone;

FIG. 8 is a graphic depicting amplitude or coherent energy, CE, for a casing wave in a free casing zone and a cemented casing zone;

FIG. 9 discloses an algorithm for using changes in the sonic attributes of a casing wave, as displayed in FIGS. 6, 7, and 8 to assign a numerical value to a free pipe flag that indicates the depth of the top of cement zone.

Figure 10:
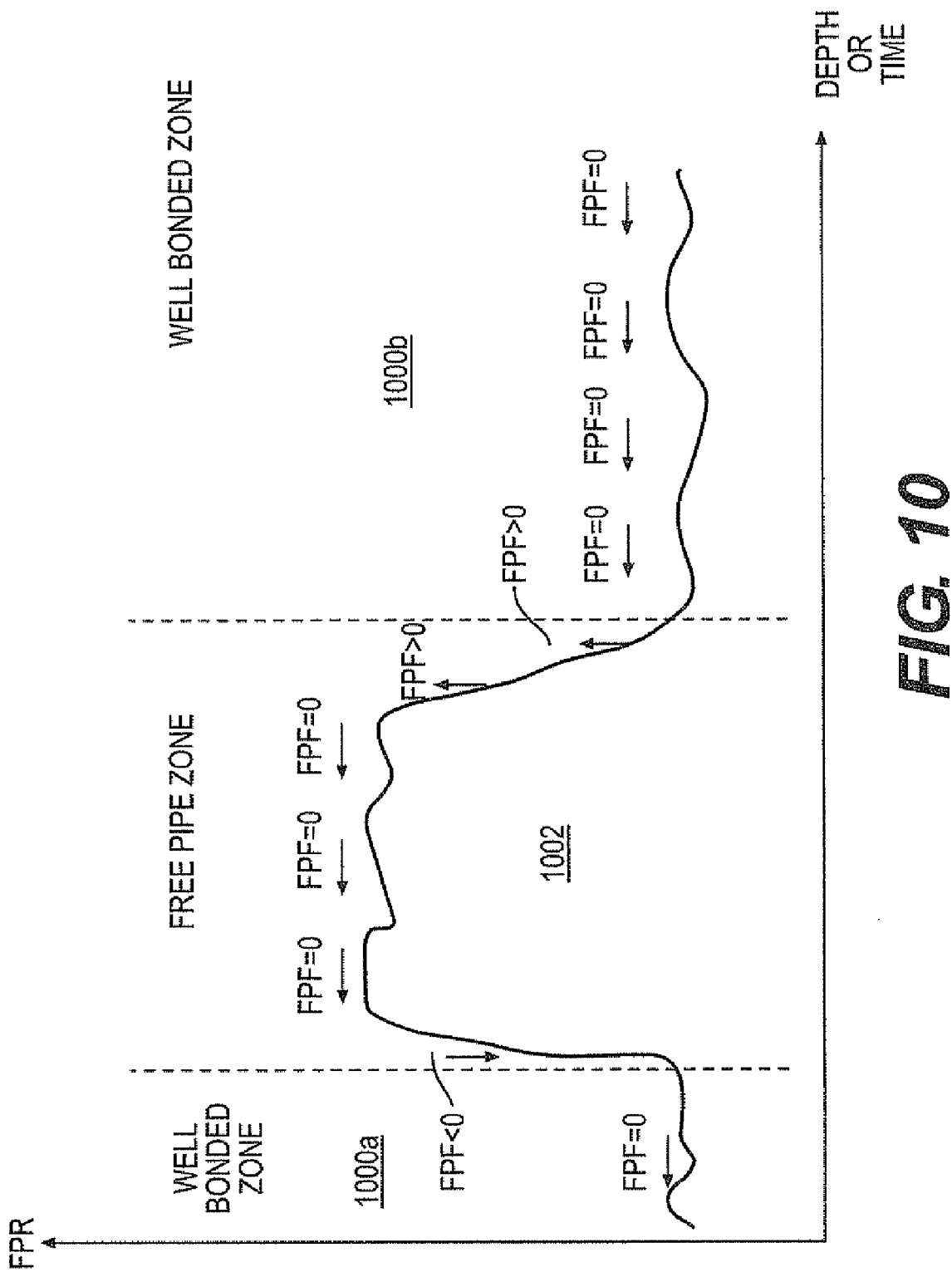

FIG. 10 is a graph illustrating how a free pipe response (FPR) and free pipe flag (FPF) change in value at the boundary between a free concrete casing zone and a good bond zone for concrete around a casing is encountered.

DETAILED DESCRIPTION

Turning now to the drawings, the subject invention is directed to the concept of using attributes of the casing wave obtained during logging while drilling operations to determine the depths of top of a cement and random peripheral casing zones where a complete cement bond is lacking.

Context of the Invention

FIG. 1 discloses a drilling derrick 100 positioned over a well hole 102 being drilled into an earth formation 104. The drilling derrick has the usual accompaniment of drilling equipment including a processor 106 and recorder 108 of the type used for measurements-while-drilling (MWD) or logging-while-drilling (LWD) operations. A more detailed disclosure of conventional drilling equipment of the type envisioned here is described in Schlumberger's Wu et al published application No. 2006/0120217 the disclosure of which is incorporated by reference as though set forth at length.

The borehole is formed by a drill string 110 carrying a drill bit 112 at its distal end. The drill bit crushes its way through earth formations as the drill string is rotated by drilling equipment within the drilling derrick. The depth of a well will vary but may be as much at 25,000 feet or more.

Turning to FIGS. 2a-2c a quadrupole acoustic shear wave LWD tool segment 114 is shown in a degree of schematic detail. A more detailed discussion of a LWD tool of this type can be seen in Hsu et al. Publication No. US 2003/0058739 of common assignment with the subject application. The disclosure of this entire publication is incorporated by reference here. Briefly, however, the quadrupole LWD tool segment 114 includes at least one transmitter ring 200 and an array of receivers 212.

FIG. 2b illustrates a transmitter 200 divided into four quadrants 202, 204, 206 and 208. Each quadrant contains a quarter-circle array of piezoelectric transducer elements 210. FIG. 2B shows six piezoelectric transducer elements in each quadrant although in some embodiments nine elements may be preferred uniformly spaced around the azimuth.

As noted above, an array of quadrupole receivers 212 is shown in FIG. 2a embedded within the side wall of drill pipe segment 114. These receivers are spaced vertically and may be five to fifty or more in a vertical array. The receivers are similar to the transmitter in that each receiver 214 of receiver array 212 has a quarter circle of piezoelectric transducer elements in each of quadrants 216, 218, 220 and 222 as shown in FIG. 2c. Each ring transducer is capable of detecting a quadrupole shear wave refracted through a formation as discussed more fully in the above referenced Hsu et al publication US 2003/0058739. Similarly, each transducer can detect waves following alternative paths, such as a casing wave that travels along the casing from transmitter to receiver.

Figure 3A:
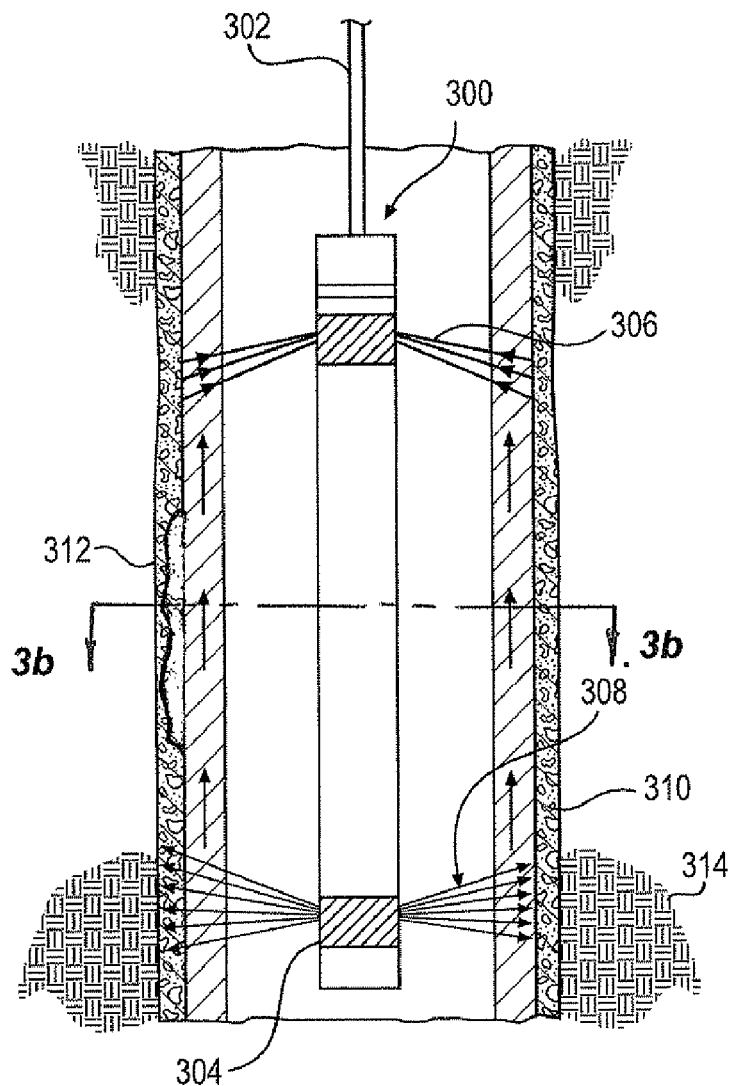
FIG. 3a is a schematic diagram of an alternative logging while drilling wireline tool positioned within a cased borehole during trips of a drill string.

While FIGS. 1-2 schematically disclose a LWD system where sonic transmitters and receivers are embedded within the side walls of a drill string near the drilling bit, FIG. 3a discloses a wireline tool or sonde 300 which is lowered down a borehole suspended by a wireline 302 following a drill string tripping operation or during subsequent logging following drilling operations. The wireline tool or sonde carries a transmitter 304 and an array of receivers 306 similar to the LWD tool discussed in connection with FIGS. 1 and 2. FIG. 3a also shows the path of a casing wave, the wave that is of interest for this invention, from transmitter 304, through the space between the tool and the casing 308, through the casing 310, and to the array of receivers 306. The path of the casing wave for the LWD tool would be similar with reduced spacing between the tool and the casing.

The casing mode can be easily excited downhole by the transmitter on the tool. It is usually excited by the monopole source of the LWD or wireline sonic tool. Dipole, quadrupole, or higher order sources could also excite the casing mode. In fact, the mud flow through the nozzles at the drill bit can also produce very strong casing mode excitation. In this case, the receivers of the LWD sonic tool could be used to sense the casing vibration without turning on the transmitter.

The energy of the casing mode is generally concentrated in the high frequency region. For optimum excitation, a special high frequency monopole source, with center frequency between 10 and 30 KHZ will be used to excite the casing mode. To enhance the dynamic range of the data acquisition and the signal to noise ratio further, a high pass or band pass filter with pass band 10 to 30 KHZ can be applied to the received signals to remove the large lower frequency tube or Stoneley wave before signals are digitized.

Figure 3B:
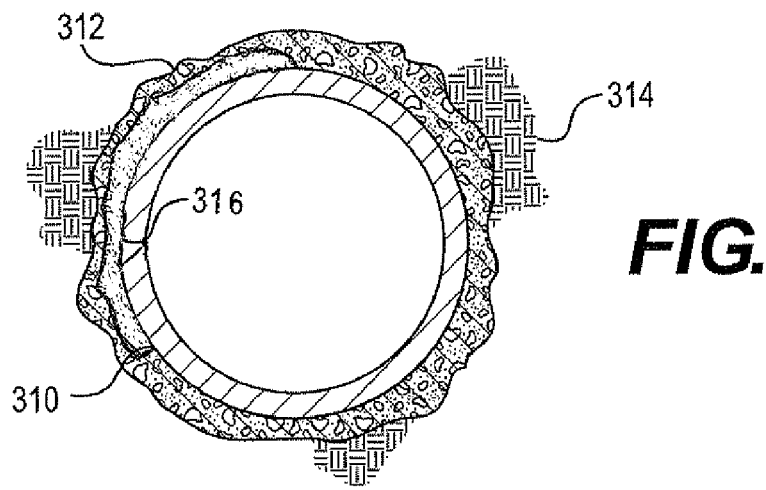
FIG. 3b is a cross-sectional view of the well hole shown in FIG. 3a beneath the wireline tool showing an annular cement zone extending between the casing and the borehole.

FIG. 3b shows a cross section of a borehole taken along section line 3b-3b in FIG. 3b with the surrounding casing 310, cement annulus 312 and earth formation 314. The tool, whether it be a LWD tool or wireline tool, is not shown. The irregularity of the cement annulus makes it difficult to accurately assess beforehand the amount of cement needed to seal off a casing segment. Accordingly, for this and other reasons, occasionally a void or gap in the cement 316 will occur which can be corrected if detected, as will be discuss more fully below.

FIG. 4 discloses a schematic of a borehole 400 that is broken at several levels so that the vertical extent of a well might be shown. A well is drilled in sections beginning with a relative large diameter surface section 402 which may be three or more feet in diameter and extend down several hundred feet to several thousand feet. Surface casing 404 is usually set to prevent washout of loose unconsolidated formations. This is usually the starting point of casing head equipment.

Downhole of the surface casing 404 is an intermediate bore hole 406 and casing 408. The intermediate casing has several functions such as to isolate and protect high pressure zones, guard against lost circulation zones, etc. Intermediate casing is usually set at 6000 feet or so and below and can be formed with one or more intermediate strings of decreasing diameter such as decreasing borehole 410 and casing 412. Intermediate casing normally ranges from five to thirteen and three eighths inches in diameter. Usually the longest run is the production borehole 414 and casing 416. All other parts of a well hole are accessories to a production string. At the bottom of the production casing is the target zone 418 and the casing is perforated 420 to provide access through the casing for production. The length of this casing may be thousands of feet in length and it can be particularly difficult to accurately estimate the amount of cement needed to completely fill the annulus surrounding the production casing 416.

FIG. 5 is a detailed illustration of a transition between the end 500 of an intermediate casing run 412 and the beginning 502. In this section, as with every section following drilling and running of the casing, a cementing operation is performed by inserting a cement tube down the cased well hole and interiorly packing off the tube near the end of the casing. The amount (volume) of cement needed to fill the annulus surrounding the last casing segment is estimated by a cement specialist and is injected down the cement tubing and out into the annulus and up the annulus to the bottom of the last cemented casing so that the entire length of the well casing is cemented. The annulus cement provides a bond between the casing and the formation, provides support for the casing, restricts the movement of fluid between zones, and seals lost circulation zones.

Although estimating the amount of cement needed to fill an annulus is an inaccurate science with each section because the bore shape is rugose and irregular, it is particularly problematic for the production casing 416 which may be thousands of feet in length. In FIG. 5 this problem is illustrated where the bottom of a previously cemented casing 412 transitions with the top of a second or smaller diameter casing production casing 416 to be cemented into place. In this, the estimated cementing job created a cement column 504 by being injected from the bottom of the casing 416 up along the casing outer annulus with a top of the cement 506 falling short of the bottom 508 of the intermediate cement column 510. This distance "A" of an open or free casing zone 512, if detected, could be filled by a cement squeezing operation well known in the art such as, for example, disclosed in Revett U.S. Pat. No. 4,531,583, the disclosure of which is incorporated by reference. Use of a LWD acoustic tools to identify lack of cement locations early facilitates inexpensive and relatively easy remedial action.

FIG. 6 illustrates how the variability of the measured slowness of the casing wave, $DT_{ca}$, 600 changes as the tool transitions between a free pipe or casing zone 602 and a cemented zone 604. In the free pipe zone 602, the measured slowness 606 is relatively constant at 57 μs/f while in the casing cemented zone 604, the average measured slowness is also about 57 μs/f, but the variation 608 observed in a set of consecutive measurements is much greater than it was in the free pipe or casing zone. The abscissa 610 shown in FIG. 6 (as well as in FIGS. 7 and 8) reflects the depth at which the measurement is taken.

The estimates of slowness for the casing wave in FIG. 6 are usually derived from the attributes of coherent peaks in the slowness-time plane (STP) where the casing wave is easily distinguished from other waves (compressional, shear, Stoneley) because it arrives much earlier at the receivers. The slowness-time-coherence (STC) processing algorithm, used to process monopole wireline or LWD sonic waveform signals for coherent arrivals at the receivers and generate the STP, is a well known method for measuring slowness and is described in the following references: C. V. Kimball and T. M. Marzetta, Geophysics, Vol. 49, 1984, pp. 264-281; U.S. Pat. No. 4,594,691 by C. Kimball and T. Marzetta, 1986; and U.S. Pat. No. 5,594,706 by R. Shenoy and S. K. Chang, 1997. The disclosures of this publications and these patents is incorporated here by reference.

The abscissa shown in FIG. 6, as well as in FIGS. 7 and 8, reflects the depth at which the measurement is taken. (Depth is the independent variable when processing is performed uphole; if processing is performed downhole, the independent variable may be time in 10 second increments corresponding to the frame time. Time is then correlated with depth.) In this diagram, if the tool is moving downward in the borehole (left to right on the graph), the change at the top of cement will be from low variability to high variability; if the tool is moving upward in the borehole (right to left on the graph), the change at the top of the cement will be from high variability to low variability. In either case, the change will be pronounced.

Attenuation Attribute

In order to compute attenuation, the total energy received within a specified time window at the kth receiver, TE(k), is determined. Receivers are numbered from 1 to n (where n=the number of receivers), with the 1st receiver being the receiver closest to the transmitter. TE(k) will decrease or attenuate with increasing k, or as the distance TR(k) from the transmitter to the receiver increases. The attenuation attribute for the casing wave (ATTca) for a given time frame is computed by applying the well known linear least square fit algorithm to the data set {(TR(k), TE(k)), k=1, 2, . . . , n–number of receivers}. The slope of the line that is fitted to this data will be negative. The absolute value of the slope is defined to be the attenuation (ATT); ATTca is, the attenuation associated with the casing wave, is plotted as a function of depth in FIG. 7.

FIG. 7 illustrates how attenuation of the casing wave, ATTca, 700 changes as the tool transitions between the free pipe zone 702 and the cemented zone 704. In the free pipe zone 702, the attenuation of the signal 706, as received at different receivers in the array, is minimal; in the cemented zone 704, the signals 706 are significantly attenuated or damped by the cement in the annulus between the borehole and the casing. As the tool moves upward or downward in the cased borehole, a significant change in the measured attenuation is observed as the tool passes between the free pipe zone and the cemented zone. This change is from low to high attenuation if the tool is moving downward and from high to low attenuation if the tool is moving upward. In either case, the observed change in attenuation provides a reliable indication of the top of the cement depth.

Coherent Energy Attribute

The wave component coherent energy attribute (CE) is computed for a given (S) and (T) in the (STP) by stacking the analytic signals across the array for a given time index "j", multiplying the result by its conjugate to get the square of the magnitude for each "j", and finally averaging over the time index "j". Specifically:

$$CE = \frac{1}{ntpw} \sum_{j=1}^{nptw} \left\{ \left[ \frac{1}{nrec} \sum_{k=1}^{nrec} w_a(j,k) \right] \times conj \left[ \frac{1}{nrec} \sum_{k=1}^{nrec} w_a(j,k) \right] \right\}$$

FIG. 8 illustrates how coherent energy of the casing wave, CEca, 800 normally changes as the tool transitions between the free pipe zone 802 and the cemented zone 804. In the free pipe zone 802, the amplitude or coherent energy of the signal, as measured at the array of receivers, is minimal; in the cemented zone, the signals are greatly attenuated or damped by the cement in the annulus between the borehole and the casing. As the tool moves upward or downward in the cased borehole, a significant change in the measured attenuation is observed as the tool passes between the free pipe zone and the cemented zone. This change is from low to high attenuation if the tool is moving downward and from high to low attenuation if the tool is moving upward. In either case, the observed change in attenuation provides a reliable indication of the top of the cement depth.

Void in Cement Detection

Casing wave slowness, attenuation, and coherent energy (DTca, ATTca, and CEca) will be collected and processed either downhole or uphole as the LWD or wireline tool transitions along the length of the most recently cemented casing segment. The tool may move either upward or downward through the segment. The data collected and processed can be displayed as a function of depth or time, as illustrated in FIGS. 6-8. While each of the three casing wave attributes can be used separately as an indicator for the free pipe zone or top of the cement, it is more robust to form a free pipe flag (FPF) based on all three indicators.

A change detection algorithm can be used to set change flags (CFs) based on a specific type of input that is continually generated as a tool proceeds through the borehole. For top of cement or random void in casing cement detection, the inputs of interest, as described above, are:

Casing wave slowness (DTca)
Casing wave attenuation (ATTca)
Casing wave coherent energy (CEca)

At each depth frame or time frame, the three casing wave attributes (DTca, ATTca, and CEca) will be supplied to the change detection algorithm. There are also two control parameters (N, D) associated with each attribute and supplied by the user. The first control parameter N represents the (user-chosen) amount of previous input data that is maintained for comparison. The most recent N inputs are placed in a buffer, and the algorithm uses these data to compute the mean M by averaging the N values in the buffer. M is a running average or mean that changes with time as new data are added and old data are discarded.

For slowness data, DTca, variability is of primary interest, so the variation or standard deviation is also computed from the data in the buffer. In the start-up period when the buffer is not full, the mean, and, where appropriate, the variation will be computed from the inputs that have been recorded. The second parameter D determines when a change in the data is significant enough to set a change flag. For ATTca or CEca, a change flag will be changed from its initial value of 0 to +1 if the new measurement of ATTca or CEca exceeds the mean of the previous measures of ATTca or CEca that are stored in the buffer by more than D.

The change flag will be changed from its initial value of 0 to −1 if the mean of the previous measures of ATTca or CEca that are stored in the buffer exceeds the new measurement of ATTca or CEca by more than D. For slowness, DTca, a change flag will be set if the computation of variance or standard deviation that includes the new measurement of slowness exhibits a change of more than D compared to one of the previous computations of variance from the contents of the buffer. Since variance computed from the data in the buffer will not change significantly, over one or two time frames, it may be preferred to set the flag based on a comparison of the new value with one computed several time frames earlier. Alternatively, for downward movement of the tool, when the initial variance and standard deviation are quite small, a change flag may be set if the most recent measurement of slowness is more than D standard deviations from the mean (where the sample mean and standard deviation are determined from the contents of the buffer).

The control parameters N and D may be different for each of the three attributes, and thus are identified in subsequent discussions with a subscript corresponding to the attribute: Ndt, Ddt, Natt, Datt, Nce, Dce.

FIG. 9 is a flow diagram corresponding to an illustrative change detection algorithm for free pipe detection. Box 900 lists the inputs to the change detection algorithms: (1) measurements, as a function of depth or time frame, of casing wave slowness, attenuation, and coherent energy (DTca, ATTca, and CEca); and (2) the control parameters supplied by the user (Ndt, Ddt, Natt, Datt, Nce, Dce). Box 902 uses the inputs associated with coherent energy to set a Change Flag or Free Pipe or Casing Flag for coherent energy (FPFce). For CEca, a change flag will be changed from its initial value of 0 to +1 if the new measurement of CEca exceeds the mean of the previous Nce measures of CEca that are stored in the buffer by more than Dce. The change flag will be changed from its initial value of 0 to −1 if the mean of the previous Nce measures of CEca that are stored in the buffer exceeds the new measurement of CEca by more than Dce.

Box 904 uses the inputs associated with attenuation in the same way to set the Free Pipe Flag for attenuation (FPFatt). Box 906 computes the mean or average, DTca, and the sample variance, VARdtca, for the Ndt measures of slowness stored in the buffer. Box 908 compares these statistics with the new measurement of slowness or a new calculation of VARdtca that includes new measurements to set the Free Pipe Flag for the variability of DTca (FPFvardt).

Any of the three Free Pipe (or Change) Flags can be used individually to estimate the start of the free pipe zone or the top of cement. It is more robust and helpful to the decision maker to have a single indicator based on all three flags. Box 910 combines the values of these three flags: FPFce, FPFatt, and FPFvardt by means of a weighting scheme to get a single value FPF. In this particular example, it is assumed that the tool is moving up the borehole. In this case, ATTca and VARdtca would tend to decrease at the top of the cement resulting in their change flags being reset from 0 to −1; CEca, on the other hand would tend to increase, resulting in its change flag being reset from 0 to +1. Thus, to obtain a consistent value for the weighting coefficient for the variability of slowness, Wdt, and the weighting coefficient for attenuation, Watt, should be taken as negative; the weighting coefficient for coherent energy, Wce, should be taken as positive. With this choice of coefficients, FPF would be expected to increase from a value of 0 to a value equal to the sum of the absolute values of the weighting factors as the tool moves up the borehole past the top of cement.

The FPF should be used together with a free pipe response indicator (FPR) which may be a combination of the basic attributes. The following are some examples of FPR which will have a sharp increase in value when free pipe is present $$FPR = CEca/(ATTca*VARca)$$

$$FPR = W\_ce*CEca + W\_att/ATTca + W\_var/VARca$$

where W_ce, W_att, and W_var are nonnegative weighting coefficients

The above FPR will be high if free pipe is present and low in the well bonded zone. There are other functional forms of the CEca, ATTca, and VARca that can be used to construct FPR such that the FPR will sharply increases when free pipe are present Displaying the FPR together with the FPF will form a more complete picture of the presence of free pipe. Shown in FIG. 10 is an illustration of this concept. In this figure the relationship between the presence of cement, well bonded, around casing 1000a and 1000b or a free casing (pipe) zone 1002 is illustrated as a function of depth or time.

As used in this patent transition zone is not intended to have any specific measurable limit but is the general area of transition from a casing of one diameter to a casing of another diameter that might not be fully cemented around the annulus between the casing sections and a surrounding borehole. Other areas of poor cement bonding and interest for detection and remediation i8n accordance with the subject invention are random and irregular zones throughout the length of a casing section. The expressions pipe and casing are intended to be interchangeable in this patent as a casing is composed of pipe segments joined together by threaded connections or by welding junctions. A logging while drilling process is intended to include the use of a drill string with, for example, sonic transmitters and receivers embedded within a drill collar portion of the drill string and also a wireline tool used during drill string trips. Where expressions have multiple meanings it is intended that the expression used be inclusive and have the broadest meaning unless there is a specific limitation noted.

The various aspects of the invention were chosen and described in order to best explain principles of the invention and its practical applications. The preceding description is intended to enable those of skill in the art to best utilize the invention in various embodiments and aspects and with modifications as are suited to the particular use contemplated. It is intended that the scope of the invention be defined by the following claims.

What is claimed is:

1. A method for determining the locations of void zones in peripheral casing cement along a borehole by a sonic logging while drilling process, said method comprising:

translating a logging while drilling tool, featuring at least one sonic transmitter and a plurality of sonic receivers, within a segment of borehole casing that includes a transition zone from a first diameter casing to a second different diameter casing wherein the casing has been at least partially cemented into place in the transition zone;

transmitting sonic signals into the casing;

receiving the sonic signals transmitted into the casing at the plurality of receivers of the logging while drilling tool as it translates through the transition zone; and processing the received casing sonic signals to obtain at least one of the attributes of coherent energy and slowness as a function of at least one of depth and time;

determining the location of a void zone in casing cement based on a change flag of the at least one of the values of coherent energy and slowness variance.

2. A method for determining void zones in peripheral casing cement as defined in claim 1 wherein said at least one attribute of coherent energy and slowness comprises:

processing the received casing sonic signals for the attribute of coherent energy.

3. A method for determining void zones in peripheral casing cement as defined in claim 1 wherein said at least one attribute of coherent energy and slowness further comprises:

processing the received casing sonic signals for the attribute of attenuation.

4. A method for determining void zones in peripheral casing cement as defined in claim 1 wherein said at least one attribute of coherent energy and slowness comprises:

processing the received casing sonic signals for the attribute of slowness.

5. A method for determining void zones in peripheral casing cement as defined in claim 3 wherein said at least one attribute of coherent energy and slowness comprises:

processing the received casing sonic signals for the attributes of coherent energy and attenuation.

6. A method for determining void zones in peripheral casing cement as defined in claim 1 wherein said at least one attribute of coherent energy and slowness comprises:

processing the received casing sonic signals for the attributes of coherent energy and slowness.

7. A method for determining void zones in peripheral casing cement as defined in claim 3 wherein said at least one attribute of coherent energy and slowness comprises:

processing the received casing sonic signals for the attributes of attenuation and slowness.

8. A method for determining void zones in peripheral casing cement as defined in claim 3 wherein said at least one attribute of coherent energy and slowness comprises:
processing the received casing sonic signals for the attributes of all three coherent energy, attenuation and slowness.

9. A method for determining void zones in peripheral casing cement as defined in claim 1 wherein said processing the received sonic signals as a function of at least one of depth and time comprises:
processing the received casing sonic signals as a function of depth within a borehole.

10. A method for determining void zones in peripheral casing cement as defined in claim 1 wherein said processing the received sonic signals as a function of at least one of depth and time comprises:
processing the received casing sonic signals as a function of time within a borehole.

11. A method for determining at least one of a beginning and an end of a void zone in peripheral casing cement in a borehole by a sonic logging while drilling process and setting a free casing flag, said method comprising:
translating a logging while drilling tool, having at least one sonic transmitter and a plurality of sonic receivers within a borehole casing;
transmitting sonic signals into the casing;
receiving the sonic signals transmitted into the casing at the plurality of receivers of the logging while drilling tool as it translates within the casing;
processing the received casing sonic signals for at least one of the attributes of coherent energy, and slowness as a function of at least one of depth and time to determine the location of a void zone in casing cement,
supplying the results of processing the received casing sonic signals for at least one of the attributes of coherent energy and slowness as a function of at least one of depth and time to a change detection algorithm to compute a free casing flag for at least one of the attributes of coherent energy and slowness variance.

12. A method for determining at least one of a beginning and an end of a void zone in peripheral casing cement in a borehole by a sonic logging while drilling process and setting a free casing flag as defined in claim 11 wherein said supplying the results of processing the received casing sonic signals for at least one of the attributes of coherent energy and slowness comprises:
supplying periodic measurements of the coherent energy attribute of the casing wave;
storing a predetermined number of the most recent measurements of coherent energy in a buffer and computing the mean of the measurements stored in the buffer;
comparing the next measurement of casing wave coherent energy to the mean of the measurements in the buffer; and
setting a change flag if the difference is greater than a predetermined value.

13. A method for determining at least one of a beginning and an end of a void zone in peripheral casing cement in a borehole by a sonic logging while drilling process and setting a free casing flag as defined in claim 11
wherein at least one of the attributes of coherent energy and slowness further comprises attenuation,
wherein said supplying the results of processing the received casing sonic signals for at least one of the attributes of coherent energy, and slowness comprises:
supplying periodic measurements of the attenuation attribute of the casing wave;
storing a predetermined number of the most recent measurements of attenuation in a buffer and computing the mean of the measurements stored in the buffer;
comparing the next measurement of casing wave attenuation to the mean of the measurements in the buffer; and
setting a change flag if the difference is greater than a predetermined value.

14. A method for determining at least one of a beginning and an end of a void zone in peripheral casing cement in a borehole by a sonic logging while drilling process and setting a free casing flag, said method comprising:
translating a logging while drilling tool, having at least one sonic transmitter and a plurality of sonic receivers within a borehole casing;
transmitting sonic signals into the casing;
receiving the sonic signals transmitted into the casing at the plurality of receivers of the logging while drilling tool as it translates within the casing;
processing the received casing sonic signals for at least one of the attributes of coherent energy, attenuation, and slowness as a function of at least one of depth and time to determine the location of a void zone in casing cement,
supplying the results of processing the received casing sonic signals for at least one of the attributes of coherent energy, attenuation, and slowness as a function of at least one of depth and time to a change detection algorithm to compute a free casing flag for at least one of the attributes of coherent energy, attenuation and slowness, wherein said supplying the results of processing the received casing sonic signals for at least one of the attributes of coherent energy, attenuation, and slowness comprises:
supplying periodic measurements of the attribute of slowness of the casing wave;
storing a predetermined number of the most recent measurements of slowness in a buffer, and
computing the mean of the measurements in the buffer, and
computing the variance of the measurements in the buffer;
storing the computed variance in a buffer that contains a predetermined number of previously computed variances;
comparing the next variance computed from the measurements of slowness in the buffer with the earliest value of variation retained in the buffer; and
setting a change flag if the difference is greater than a predetermined value.

15. A method for determining at least one of a beginning and an end of a void zone in peripheral casing cement in a borehole by a sonic logging while drilling process and setting a free casing flag, said method comprising:
translating a logging while drilling tool, having at least one sonic transmitter and a plurality of sonic receivers within a borehole casing;
transmitting sonic signals into the casing;
receiving the sonic signals transmitted into the casing at the plurality of receivers of the logging while drilling tool as it translates within the casing;
processing the received casing sonic signals for at least one of the attributes of coherent energy, attenuation, and slowness as a function of at least one of depth and time to determine the location of a void zone in casing cement,
supplying the results of processing the received casing sonic signals for at least one of the attributes of coherent energy, attenuation, and slowness as a function of at least one of depth and time to a change detection algorithm to compute a free casing flag for at least one of the attributes of coherent energy, attenuation and slowness, wherein said supplying the results of processing the received casing sonic signals for at least one of the attributes of coherent energy, attenuation, and slowness comprises:

supplying periodic measurements of the slowness attribute of the casing wave;

storing a predetermined number of the most recent measurements of slowness in a buffer, computing the mean and variance of the measurements of slowness in the buffer;

comparing the next measurement of casing wave slowness to the mean of the measurements in the buffer; and setting a change flag if the difference is greater than a predetermined number of standard deviations as computed from the measurements of slowness in the buffer.

16. A method for determining at least one of a beginning and an end of a void zone in peripheral casing cement in a borehole by a sonic logging while drilling process by means of a computed free pipe response indicator, said method comprising:

translating a logging while drilling tool, having at least one sonic transmitter and a plurality of sonic receivers, within a segment of borehole casing that includes a transition zone from a first diameter casing to a second different diameter casing wherein the casing has been at least partially cemented into place in the transition zone;

transmitting sonic signals into the casing;

receiving the sonic signals transmitted into the casing at the plurality of receivers of the logging while drilling tool as it translates through the transition zone;

processing the received casing sonic signals for at Least two of the attributes of coherent energy, attenuation, and slowness as a function of at least one of depth and time;

supplying the results of processing the received casing sonic signals for at least two of the attributes of coherent energy, attenuation, and slowness as a function of at least one of depth and time to a change detection algorithms to compute free casing flags for at least two of the attributes of coherent energy, attenuation, and slowness variance;

applying a weighting coefficient to the free casing flag values computed for at least two of the attributes of coherent energy, attenuation, and slowness variance; and determining the value of a combined free casing flag based on the weighted sum of at least two of the free casing flag values associated with the attributes of coherent energy, attenuation and slowness variance.

17. A method for determining at least one of a beginning and an end of a void zone in peripheral casing cement in a borehole by a sonic logging while drilling process and setting a free pipe response indicator that will assume larger values in void zones than in cemented zones, said method comprising:

translating a logging while drilling tool, featuring at least one sonic transmitter and a plurality of sonic receivers within a borehole casing;

transmitting sonic signals into the casing;

receiving the sonic signals transmitted into the casing at the plurality of receivers of the logging while drilling tool as it translates within the casing;

processing the received casing sonic signals for at least one of the attributes of coherent energy attenuation, and slowness as a function of at least one of depth and time;

supplying periodic measurements of at least one of the attributes of coherent energy and slowness as a function of at least one of depth and time to an algorithm and computing a free pipe response indicator for at least one of the values of coherent energy and slowness variance.

18. A method for determining at least one of a beginning and an end of a void zone in peripheral casing cement in a borehole by a sonic logging while drilling process and setting a free pipe response indicator that will assume significantly larger values in void zones than in cemented zones, as defined in claim 17 wherein said supplying the results of processing the received casing sonic signals for at least one of the attributes of coherent energy and slowness comprises:

supplying periodic measurements of the coherent energy attribute of the casing wave;

storing a predetermined number of the most recent measurements of coherent energy in a buffer and computing the mean of the measurements stored in the buffer; and computing the value of a free pipe response indicator with a formula where the value of the free pipe response indicator increases when the values of mean coherent energy increases.

19. A method for determining at least one of a beginning and an end of a void zone in peripheral casing cement in a borehole by a sonic logging while drilling process and setting a free pipe response indicator that will assume significantly larger values in void zones than in cemented zones as defined in claim 17, wherein at least one of the attributes of coherent energy and slowness further comprises attenuation, wherein said supplying the results of processing the received casing sonic signals for at least one of the attributes of coherent energy and slowness comprises:

supplying periodic measurements of the attenuation attribute of the casing wave;

storing a predetermined number of the most recent measurements of attenuation in a buffer and computing the mean of the measurements stored in the buffer; and computing the value of a free pipe response indicator with a formula where the value of the free pipe response indicator decreases when the value of mean attenuation increases.

20. A method for determining at least one of a beginning and an end of a void zone in peripheral casing cement in a borehole by a sonic logging while drilling process and setting a free pipe response indicator that will assume larger values in void zones than in cemented zones, said method comprising:

translating a logging while drilling tool, featuring at least one sonic transmitter and a plurality of sonic receivers within a borehole casing;

transmitting sonic signals into the casing;

receiving the sonic signals transmitted into the casing at the plurality of receivers of the logging while drilling tool as it translates within the casing;

processing the received casing sonic signals for at least one of the attributes of coherent energy, attenuation, and slowness as a function of at least one of depth and time;

supplying periodic measurements of at least one of the attributes of coherent energy, attenuation, and slowness as a function of at least one of depth and time to an algorithm and computing a free pipe response indicator, wherein said supplying the results of processing the received casing sonic signals for at least one of the attributes of coherent energy, attenuation, and slowness comprises:
  supplying periodic measurements of the attribute of slowness of the casing wave;
  storing a predetermined number of the most recent measurements of slowness in a buffer, and
    computing the mean of the measurements in the buffer, and
    computing the variance of the measurements in the buffer;
  computing the value of a free pipe response indicator with a formula where the value of the free pipe response indicator decreases when the values of the computed variance of the slowness measurements increases.

21. A method for determining at least one of a beginning and an end of a void zone in peripheral casing cement in a borehole by a sonic logging while drilling process and setting a free pipe response indicator that will assume significantly larger values in void zones than in cemented zones, said method comprising:
  translating a logging while drilling tool, having at least one sonic transmitter and a plurality of sonic receivers, within a borehole casing;
  transmitting sonic signals into the casing;
  receiving the sonic signals transmitted into the easing at the plurality of receivers of the logging while drilling tool as it translates within the casing;
  processing the received easing sonic signals for at least two of the attributes of coherent energy, attenuation, and slowness as a function of at least one of depth and time;
  supplying the results of processing the received casing sonic signals for at least two of the attributes of coherent energy, attenuation, and slowness as a function of at least one of depth and time with an algorithm that computes at least two of the values of mean coherent energy, mean attenuation, and slowness variance over a predetermined number of the most recent measurements of the at least two of mean coherent energy, attenuation and slowness variance; and
  computing a free pipe response indicator using a formula that involves at least two of the values of mean coherent energy, mean attenuation, and slowness variance and where applicable the free pipe response indicator increases with increasing mean coherent energy and decreases with increasing mean attenuation and slowness variance.

* * * * *